Patented Feb. 16, 1943

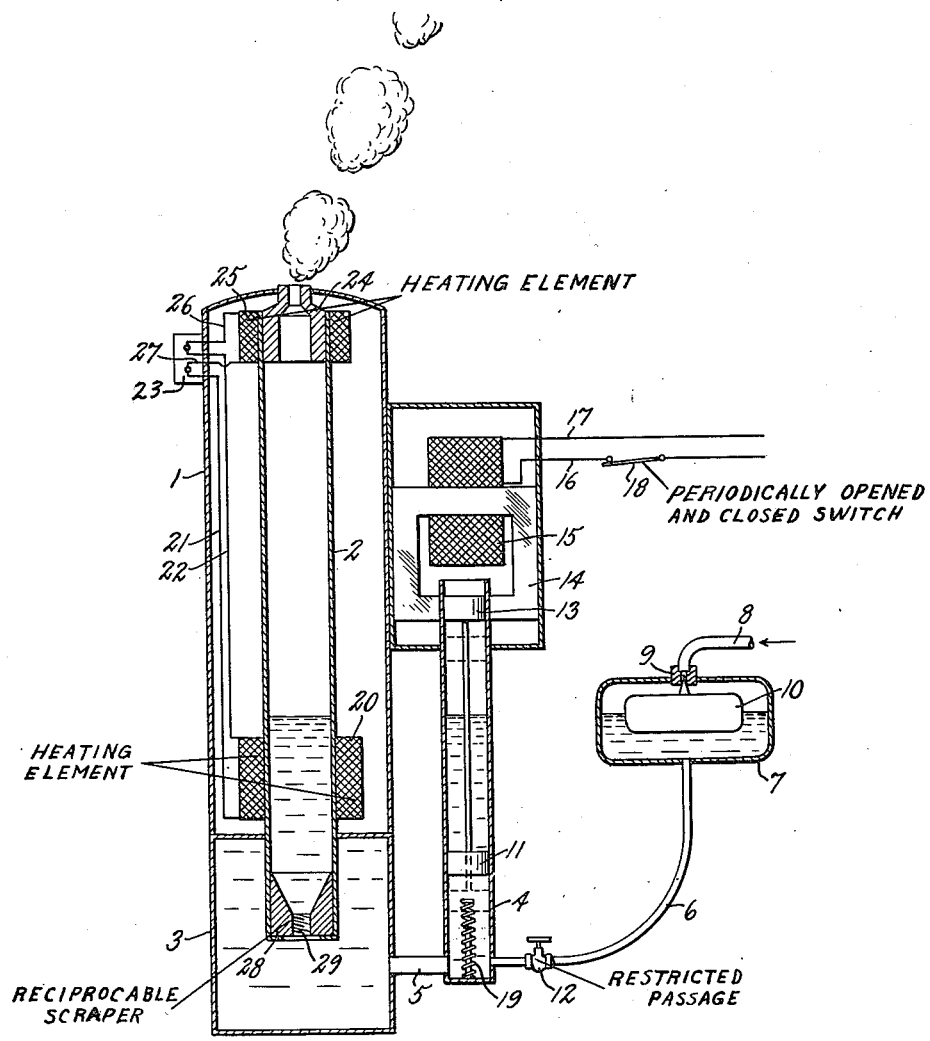

2,311,199

UNITED STATES PATENT OFFICE 2,311,199

METHOD AND APPARATUS FOR PRODUCTION OF SMOKE OR FOG

Per Anton Åstradsson, Stockholm, Sweden, assignor to Svenska Aktiebolaget Gasaccumulator, Stockholm, Sweden, a corporation of Sweden Application December 6, 1940, Serial No. 368,878
In Sweden December 19, 1939

8 Claims. (Cl. 73—189)

The present invention refers to production of smoke or fog, especially for indicating wind direction, signalling or other similar purposes, by discharging easily condensable or sublimable gases or vapors into the open air. Devices of this kind, previously known, have the disadvantage that a great part of the vapors are condensed, or sublimated in the nozzle through which they are let out. This means in the first place, a reduction of the smoke producing effect, but involves also considerable disadvantages, especially when the gases or vapors, directly or indirectly, give rise to the formation of solid particles. The formation of such particles may, partly, take place directly through sublimation or congelation of liquid particles, and partly, through chemical decomposition of condensed liquid. The latter is the case when heavy mineral oils are used for the production of fog or smoke. In liquid state, these oils very easily decompose under the influence of heat, whereby solid carbon particles are segregated.

If thus an oil vapor is used for the production of fog, the vapor being let out through a nozzle, the temperature of which is lower than the dew point of the oil vapor, the oil condenses on the nozzle. The oil is then decomposed and solid carbon particles are deposited in the nozzle, which will gradually get choked. According to the present invention this disadvantage is avoided by keeping the nozzle at a temperature, which is higher than the dew point of the vapor. However, the dew point of certain oil vapors in common use lies near the ignition temperature or even higher. In such a case there is a risk of the vapor, escaping through the nozzle, being ignited.

In one utilization of the invention, the smoke producing gas or vapor is therefore, before leaving the nozzle, mixed with a dilution gas with relatively low boiling point, preferably air, whereby the dew point of the gas or the vapor is lowered. It is then possible to keep the nozzle at a lower temperature without condensation taking place, and the risk of ignition is entirely eliminated. The mixing of the gas or the vapor with dilution gas is preferably effected by the inlet of dilution gas through the nozzle taking place periodically, alternating with the outlet of gas or vapor mingled with dilution gas.

The single figure of the accompanying drawing shows diagrammatically an embodiment of the invention in the shape of a smoke generator for heavy mineral oils, intended to serve as a wind direction indicator. The smoke generator is provided with a casing 1, in which a vertical vaporization tube 2 is arranged. The lower end of this tube projects into an oil tank 3, placed in the bottom part of the casing 1, where the interior of the pipe communicates with the oil tank. By means of a cylinder 4 and conduits 5 and 6 the oil tank 3 is connected with a float housing or chamber 7. The supply of oil to the float chamber through a conduit 8 is regulated by means of a valve 9, which is controlled by a float 10. The float chamber 7 is situated at such a height that the oil level is in the vaporization tube 2 rises to a certain height a good way up in the vaporization tube as shown on the drawing. The cylinder 4 is situated parallel with and on the same level with the lower part of the vaporization tube. A piston 11 is arranged to run easily in the cylinder 4, so as to allow oil to enter behind the piston, whereas the oil does not rise higher than the level determined by the oil in the float chamber.

In the conduit 6 close to the cylinder 4 is a constriction 12 which can be adjusted manually with regard to the viscosity of the oil. The piston 11 is rigidly connected with an armature 13 which is influenced by an electromagnet. Current is fed to the winding 15 of the electromagnet through leads 16 and 17, of which the one 16 is provided with a switch 18, which by means of some device of well-known type, not shown here, such as a flasher, is made to close and break the circuit at suitable intervals. The piston 11, indicated on the drawing by full lines in its upper position, is in its lower position, indicated by dotted lines, in contact with a helical spring 19, by means of which the movement of the piston is limited in that direction.

The part of the vaporization tube which is filled with oil and situated above the oil tank 3 is surrounded by an electric heating element 20, to which current is supplied through leads 21 and 22, which are connected to a terminal box 23. The heating element 20 is entirely arranged below the oil level in the vaporization tube. In this way, it is only the walls, which are in touch with liquid oil and form an oil receptacle, that are heated, whereby the unavoidable deposition of carbon in the vaporization tube is considerably reduced. The top end of the tube 2 is provided with a nozzle 24, surrounded by an electric heating element 25, which by means of leads 26 and 27 is connected to the terminal box 23.

In the bottom part of the vaporization tube 2 there is a cylindrical scraper 28. The upper edge of this scraper is comparatively sharp and is in contact with the inner surface of the tube 2.

The scraper is provided with a centrally arranged threaded hole 29, normally serving as a communication duct between the tank 3 and the tube. The purpose of this scraper is to clean the inside of the tube, whereat a rod, the lower end of which is threaded, is pushed down into the tube 2, preferably after the nozzle 24 being removed, and screwed into the hole 29. The scraper 28 is then pulled upwards, whereby the tube walls are scraped clean, and the solid particles, deposited on the tube walls are thus loosened by the scraper, and brought up to the top end of the tube and removed.

The smoke generator described above operates in the following manner:

It is supposed that oil is supplied to the smoke generator so that the oil in the vaporization tube 2 reaches the primary level indicated on the drawing, and that the heating elements 20 and 25 are switched on, emitting heat, so that oil vapor is produced from the oil surface in the vaporization tube 2. Electric current is fed to the coil 15 of the electromagnet 14. By means of the flasher, not shown, or some similar device, the switch 18 is opened, so that the electromagnet can no longer hold the armature 13. Consequently, the armature and the piston are lowered to the position indicated by dotted lines, thus displacing a certain oil volume. Owing to the constriction 12 this oil quantity can not, to any considerable extent, flow back to the float chamber 7 but is forced through the conduit 5 into the oil tank 3 and from there into the vaporization tube 2. Consequently, the oil level in the vaporization tube 2 rises, whereby a quantity of oil vapor, corresponding to the increase of oil in the vaporization tube, is pressed out through the nozzle 24 and carried away by the wind, thus indicating the wind direction. When the circuit immediately thereafter is closed by means of the switch 18, the armature 13 is pulled up, which means that the piston 11 is brought back to its starting position, which is indicated by full lines. Owing to the constriction 12, no considerable quantity of oil can be sucked into the cylinder from the float chamber 7, but this takes place from the oil tank 3, so that the oil level in the vaporization tube sinks and air is sucked in through the nozzle 24 into the vaporization tube. This air is mixed with the oil vapor in the upper part of the vaporization tube, whereby the dew point of the oil vapor is lowered. The volume of the chamber filled with oil vapor in the vaporization tube 2 is thus alternately decreased and increased, with the result that oil vapor is forced out and air is sucked in. A quantity of oil, corresponding to the quantity of vaporized oil, indicated above, flows from the float chamber 7 to the tank, and into the vaporization tube 2, until the oil in the vaporization pipe reaches the same level as the oil in the float chamber 7, which latter level, as mentioned before, is predetermined. The operation described above is repeated, as soon as the switch 18 is again opened.

The influx of a certain quantity of air into the vaporization tube which, in the way described above, follows each puff of a cloud of oil vapor, thus lowers the dew point of the oil vapor escaping through the nozzle. In this way, by means of the heating element 25, it is possible to keep the nozzle 24 at a temperature high enough to prevent the oil from condensing therein, but not high enough to ignite the escaping mixture of oil vapor and air.

The invention is not to be considered to be limited to the embodiment described herein and shown on the drawing, as the embodiment may be varied within the scope of the invention. The method of lowering the temperature of the oil vapor through the inlet of air, and simultaneously avoiding condensation of oil by heating the nozzle, may be applied in smoke generators, executed in different ways. Some other liquid may be used instead of oil for the production of smoke or fog.

What is claimed is:

1. The method of producing fog which includes intermittently discharging easily condensable gas into the open air from a chamber through a nozzle, alternately sucking air into the chamber through the nozzle for diluting the gas in the chamber to thereby lower its dew point, and maintaining the nozzle at a temperature above the dew point of the mixture of air and gas and below the ignition point of the mixture.

2. The method of producing fog which includes supplying an easily condensable gas to a chamber communicating with the atmosphere through a nozzle, repeatedly varying the volume of the chamber to alternately suck air in, and force a mixture of air and gas out through the nozzle, and maintaining the nozzle at a temperature above the dew point of the mixture and below the ignition point thereof.

3. In an apparatus for the production of fog, means forming a vaporizing chamber, a nozzle providing continuous communication between the interior of said chamber and the atmosphere, means for supplying said chamber with fog producing substance, means for successively decreasing and increasing the volume of substance in said chamber to alternately suck air in through said nozzle and eject a mixture of air and fog producing vapor through said nozzle, and means for heating said nozzle to a temperature above the dew point and below the ignition point of said mixture.

4. In an apparatus for the production of fog, means forming a vaporizing chamber, a nozzle providing continuous communication between the interior of said chamber and the atmosphere, means for maintaining said chamber partially filled with fog producing liquid, means for successively decreasing and increasing the volume of liquid in said chamber to alternately suck air in through said nozzle and eject therefrom a mixture of air and fog producing vapor, means for heating a portion of the chamber wall which is always contacted by liquid, to thereby produce the fog producing vapor, and means for heating said nozzle to a temperature above the dew point and below the ignition point of said mixture.

5. In an apparatus for the production of fog, means forming a vaporizing chamber, a nozzle providing continuous communication between the interior of said chamber and the atmosphere, a vessel having a vertical extent at least partially coextensive with said chamber, a conduit having a restricted orifice connected between the lower parts of said chamber and vessel, means for supplying liquid to said vessel, a float valve for maintaining the level therein at approximately the maximum level desired in said chamber, means forming an enclosed space of variable volume connected to said chamber for successively decreasing and increasing the volume of liquid in said chamber to alternately suck air in and eject a mixture of air and fog producing vapor through said nozzle, and means for heating said nozzle to a temperature above the dew point and below the ignition point of said vapor.

6. In an apparatus for the production of fog, means forming a vaporizing chamber, a nozzle providing continuous communication between the interior of said chamber and the atmosphere, a vessel having a vertical extent at least partially coextensive with said chamber, a conduit having a restricted orifice connected between the lower parts of said chamber and vessel, means for supplying liquid to said vessel, a float valve for maintaining the level therein at approximately the maximum level desired in said chamber, means forming an enclosed space of variable volume connected to said chamber for successively decreasing and increasing the volume of liquid in said chamber to alternately suck air in and eject a mixture of air and fog producing vapor through said nozzle, means for heating a portion of the chamber walls which is always contacted by liquid, to thereby produce the fog producing vapor, and means for heating said nozzle to a temperature above the dew point and below the ignition point of said mixture.

7. In an apparatus for the production of fog, means forming a vaporizing chamber, a nozzle providing continuous communication between the interior of said chamber and the atmosphere, a vessel having a vertical extent at least partially coextensive with said chamber, a conduit having a restricted orifice connected between the lower parts of said chamber and vessel, means for supplying liquid to said vessel, a float valve for maintaining the level therein at approximately the maximum level desired in said chamber, a cylinder connected to said chamber, a piston reciprocable within said cylinder to vary the volume thereof to successively decrease and increase the volume of liquid in said chamber, to thereby suck air in and eject a mixture of air and fog producing vapor through said nozzle, and means for heating said nozzle to a temperature above the dew point and below the ignition point of said mixture.

8. In an apparatus for the production of fog, means forming a vaporizing chamber, a nozzle providing continuous communication between the interior of said chamber and the atmosphere, a vessel having a vertical extent at least partially coextensive with said chamber, a conduit having a restricted orifice connected between the lower parts of said chamber and vessel, means for supplying liquid to said vessel, a float valve for maintaining the level therein at approximately the maximum level desired in said chamber, a cylinder connected to said chamber, a piston reciprocable within said cylinder, electromagnetic means for reciprocating said piston to successively decrease and increase the volume of liquid in said chamber to thereby alternately suck air in and eject a mixture of air and fog producing vapor through said nozzle, and means for heating said nozzle to a temperature above the dew point and below the ignition point of said mixture.

PER ANTON ASTRADSSON.